United States Patent [19]
Higgins, Jr.

[11] 3,908,097

[45] Sept. 23, 1975

[54] HEADSET WITH REVERSIBLE EARCUP

[75] Inventor: Robert K. Higgins, Jr., Cheraw, S.C.

[73] Assignee: The United States of America as represented by the Secretary of the Air Force, Washington, D.C.

[22] Filed: May 21, 1974

[21] Appl. No.: 471,932

[52] U.S. Cl. .......... 179/156 A
[51] Int. Cl.$^2$ .......... H04M 1/05
[58] Field of Search .......... 179/156 R, 182 R, 156 A

[56] References Cited

UNITED STATES PATENTS 2,235,372 3/1941 Kalbitz .......... 179/156 R

FOREIGN PATENTS OR APPLICATIONS 1,129,211 9/1956 France .......... 179/156 A

*Primary Examiner*—William C. Cooper
*Attorney, Agent, or Firm*—Joseph E. Rusz; Arthur R. Parker

[57] ABSTRACT

A communications headset incorporating a headband having a pair of depending yoke elements disposable on opposite sides of the wearer's head, a first earphone and earcup mounting a microphone and supported by one yoke element, and a second earphone and earcup rotatably mounted to a reversed position in the other yoke element and having a cushioned rear surface for the relatively comfortable and prolonged positioning thereof against the wearer's head to one side of and thereby automatically exposing one ear to enable the positive and relatively clear verbal communication with other personnel.

1 Claim, 4 Drawing Figures

US Patent Sept. 23,1975 3,908,097

HEADSET WITH REVERSIBLE EARCUP

RIGHTS OF THE GOVERNMENT

The invention described herein may be manufactured and used by or for the Government of the United States for all governmental purposes without the payment of any royalty.

BACKGROUND OF THE INVENTION

This invention relates to a communications headset having a reversible earcup cushioned on the rear side to enable its removal from the ear and placement in a rotated and relatively extended, comfortable position on the head of the wearer to expose the ear and thus ensure relatively clear direct verbal communication during relatively low ambient noise conditions.

In general, communications headsets are designed to protect the wearer's ears from an excessive noise background, as when the engines of an aircraft are being started or during aircraft climbing conditions, and, at the same time, enable the clear and intelligible reception of vital messages being communicated. For this purpose, a cushion element is most usually assembled to the inner surface of the earcup portion of each earphone and is made of a sufficiently enlarged configuration to completely cover and envelope each ear of the wearer of the headset. Unfortunately, however, when the wearer of a conventional headset desires to engage in a direct verbal communication with other personnel during relatively low ambient noise conditions and when communication is not being had over the headset, the earcup not having the microphone attached thereto must be removed from the appropriate ear and simply placed or repositioned to one side thereof on the wearer's head while, in the meantime, the remaining ear of the wearer is being used to monitor incoming messages. This is an unsatisfactory, although workable technique, because the enlarged, ear-enveloping cushion of the repositioned earcup must generally be moved a sufficient distance to one side to all but completely clear the ear and allow its relatively undisturbed reception of the aforementioned direct verbal message. The excessive movement required thereof to enable the enlarged cushion cover on the earcup to completely clear and expose the appropriate ear most generally suffers from the not insignificant disadvantage of at least partially covering and blocking the view from the appropriate eye of the wearer. Of course, a further disadvantage in this presently used technique resides in the fact that the messages coming over the displaced earcup might still often be heard through the nearly adjacent ear of the wearer and thus unterfer with the latter's direct verbal communication with nearby aircrew or other personnel.

With the incoming messages being heard often times by both ears, the wearer of the conventional types of headsets would not merely be able to monitor incoming messages with the uncovered ear, as desired, and, accordingly, the intended direct verbal communication is made much more difficult, if not impossible to comprehend. On the ohter hand, the improved and yet simplified headset of the present invention provides a novel alternative to the above-outlined problem in a unique manner, as will appear self-evident hereinafter in the following summary and detailed description thereof.

SUMMARY OF THE INVENTION

The present invention consists in a communications headset having a headband terminating in a pair of integral, depending and spaced-apart yokes each mounting a separate earphone/earcup member for respective disposal over and against the ears of the intended wearer. One earphone-earcup member mounts a microphone for positioning in front of the wearer's mouth and the other earphone/earcup is, in accordaance with the novel teachings of the present invention, expressly and uniquely made rotatable approximately 180° to a completely reverse and outwardly-facing position with the receiving end of the earphone/earcup naturally facing away from the previously-covered ear. In this connection, it is noted that the standard earcup elements of conventional communications headsets are generally designed to be somewhat rotatably mounted in depending relation to the headband member thereof but this relative rotation is most often on the order of only 10°–15° for the purpose of providing a relatively slight adjustment to allow the earcup to accommodate itself to the particular and varying configurations of the heads of many wearers. In other words, the conventional earcup mounting means prevents the 180° rotation feature of the present invention. Of course, with the above-described unique rotatable capability of the specified earcup to a completely reversed position and, moreover, with the normally-rear side thereof being made of a considerably smaller size than that of the previously-noted enlarged ear enveloping-cushion thereof, the inventive earcup of the present system may be generally and with great facility relocated on the wearer's head in the previously-described reversed position, to one side of, and completely exposing the appropriate ear, both without blocking or partially blocking the view from the wearer's eye on that side, as is the case with conventional headsets of this type, or moving the microphone on the other earcup any significant distance out of alignment with the wearer's mouth.

Other inherent advantages and benefits of the invention will become more readily apparent from the following disclosure taken in connection with the accompanying drawings, in which:

DESCRIPTION OF THE PREFERRED EMBODIMENT

Figure 1:
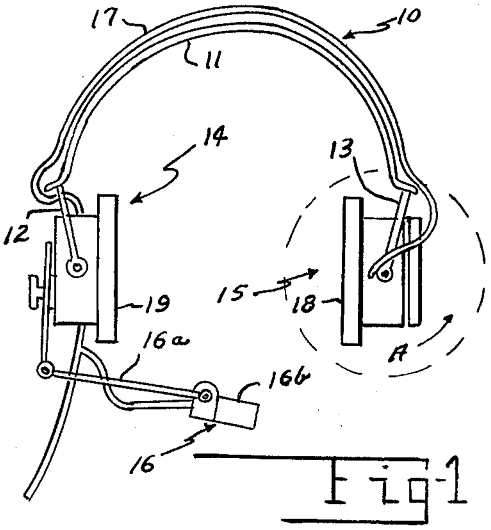
FIG. 1 is an overall partly schematic view from the rear of the new and improved communications headset of the present invention, illustrating both earcups thereof in their normal, inward-facing position.

Referring generally to the drawings and, in particular, to FIG. 1 thereof, the new and improved communications headset of the present invention is illustrated generally at 10 as consisting principally of a resilient headband 11, a pair of oppositely-disposed yoke elements, at 12 and 13 mounted in depending relation from the opposite ends of said headband 11 for respective positioning, when being worn, on opposite sides of the wearer's head, and a left and right earphone/earcup, at 14 and 15, respectively attached to the yoke elements 12 and 13. A microphone, indicated generally at 16 with its microphone arm 16*a* and head 16*b*, may be preferably mounted to the left earphone/earcup 14, as shown, and the communications cord for the headset-microphone is depicted at 17.

Figure 2A:
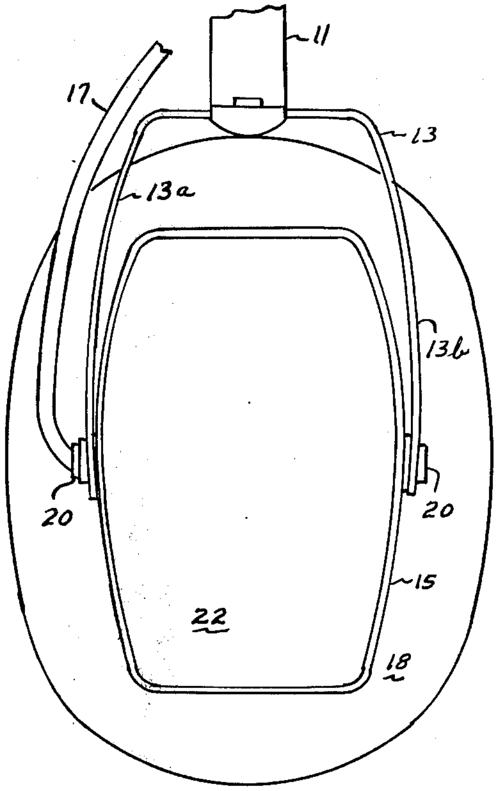
FIGS. 2 and 2*a* respectively show relatively enlarged, partly broken-away and somewhat schematic, rear and outside fragmentary views, more clearly showing details of the inventive earcup and the mounting thereof to one of the headset-headband yoke elements.
Figure 2:
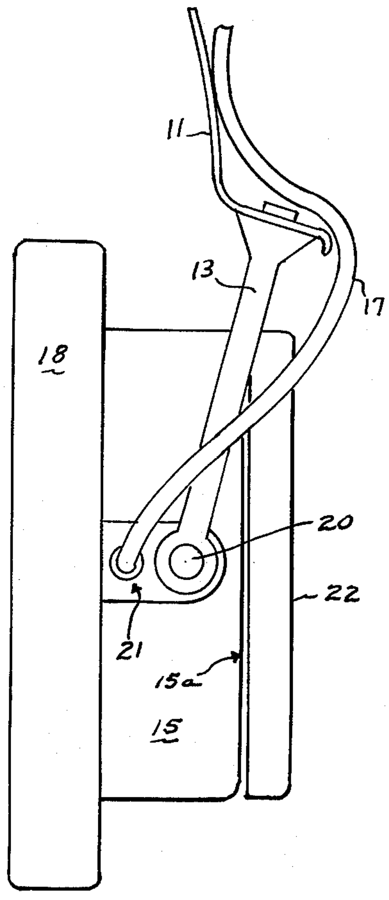

With particular reference to FIGS. 2 and 2*a*, the novel right earcup of the invention, seen generally at the reference numeral 15 and which is of the so-called circumaural type, incorporates a toroidal shaped and enlarged cushion 18 on its normally-inwardly facing side, which cushion 18 seals the earcup 15 on the wearer's head completely over, and surrounding and enveloping the right ear, in this case, when the inventive headset 10 is to be worn with the right earcup 15 in position to cover the right ear of the wearer, which is the normal position for the crew member when specifically receiving and transmitting and, particularly, when there is a high degree of environmental noise present. The similar earcup cushion for the left ear is seen at 19 in FIG. 1.

The right yoke member 13 is integrally attached, at its upper end, to the appropriate end of the headband 11, as depicted in the aforementioned enlarged views of FIGS. 2 and 2*a*. As seen specifically in FIG. 2*a*, the spaced-apart lower ends or arms 13*a* and 13*b* of the yoke member 13 support the earphone 15 in pivotal relation thereto by means of the spaced-apart and opposed pivots at 20. Of course, because of the above-described pivotal relation between the right yoke member 13 and, in particular, because of the substantially complete freedom of movement afforded to the earcup 15 due to the spread-apart relation of the yoke arms 13*a*, 13*b* and the reduced size of the rear side 15*a* (FIG. 2) of the earcup 15, the latter member may be completely rotated in a counterclockwise direction, as viewed from the rear of the headset 10 and as indicated at the arrow "A" in FIG. 1, approximately 180° to the fully reversed position indicated in FIG. 3 with the side thereof incorporating the enlarged cushion 18 now facing in an outward direction away from the right ear of the wearer.

Figure 3:
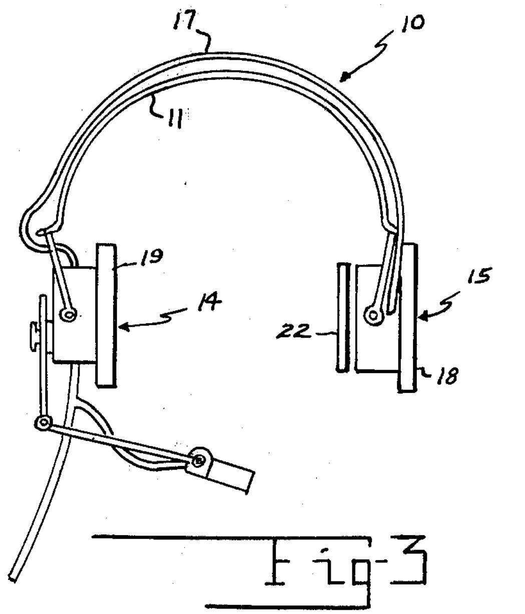
FIG. 3 is a second overall partly schematic view from the rear, as in FIG. 1, of the inventive headset but showing the rotated, outwardly-facing position of the new and improved earcup thereof.

To specifically accommodate the aforementioned counterclockwise rotation of 180° of the right earcup 15 to the outer position of FIG. 3, the branch of the communications cord 17 goes to the right earphone is lengthened and made to enter the earcup 15 at a position, indicated generally at 21 in FIG. 2, near or adjacent to the corresponding pivot 20. Although the principal feature of the present invention is in the above-described ability of the right earcup 15 to rotate to its reverse position, another important feature thereof resides in the provision and/or incorporation of a padding suitably disposed on the normal right or outer side or, in other words, on the back of the right earcup 15, which padding is indicated at the reference numeral 22 in FIGS. 2, 2*a* and 3. It is this padding 22 on the earcup 15 that actually gives a greater incentive to the wearer to remove the right earcup 15 from its normal message-receiving position, rotate it 180° to the previously-referred reversed position with the enlarged cushion 18 side thereof facing outwardly, as seen in the aforementioned FIG. 3, and, finally, to reposition the right earcup in the said rotated position on the wear's head to one side of the corresponding wearer'Naturally, with the padding 22 providing a cushioned rear surface to the earcup 15, the inventive headset 10 may be worn comfortably and therefore for a relatively prolonged period with one ear remaining covered to continually monitor incoming messages and the other completely exposed, as and when appropriate, to enable direct verbal communication with other personnel.

Thus, a new and improved headset-microphone has been developed by the present invention whereby a reversible earcup with a padded back surface is utilized to enable the prolonged use of the headset in two positions of adjustment including, first, a communicative position in which both ears of the wearer are covered by the headset-earcups and a second position leaving one earcup in an ear-covered position and the second earcup in a rotated, reverse position uncovering and completely exposing one ear for direct verbal communications with nearby personnel.

Although the unique and yet simplified reversible earcup-headset of this invention is primarily concerned with and specifically designed for aircrew members, it is to be understood that the inventive headset is naturally equally applicable for other uses to include within and around aircraft simulators, experimental and training environmental chambers, by aircraft flight controllers, telephone and other communications operators, and by various ground and onboard ship personnel.

I claim:

1. A communications headset comprising; a resilient headband having a main headband portion positionable over or around the head of a wearer and terminating in depending and opposite end portions disposed adjacent or nearly adjacent the ears of the wearer; a communications cord disposed around said headband and further respectively mounting to the opposite end portions thereof a pair of earphone/earcup-yoke member-holding means respectively attached to the said headband-opposite end portions; a first earphone/earcup member receiving a first end portion of the communications cord and disposed in a supporting and rotatable relation to one of the said earphone/earcup-yoke member-holding means about pivot points centrally disposed on opposite sides of the circumference of said first earphone/earcup member for thereby accommodating one side of the specific head configuration thereto; a microphone mounted to, and providing for only a relatively limited or restrained rotation to said first earphone/earcup member and further positioned with its head adjusted adjacent or nearly adjacent to the wearer's mouth; a second earphone/earcup member supported in the other of said earphone/earcup-yoke member-holding means similarly disposed about pivot points centrally disposed on opposite sides of the circumferences of said second earphone/earcup member; each of said earphone/earcup members having a first, main, relatively enlarged and toroidal-shaped cushioned element incorporated on its normally inwardly-facing side and normally disposed in an all-encompassing, sealed and first, headset-communicating position around and over the ears of the wearer; said yoke-member holding means for said second earphone/earcup member having a pair of relatively wide, spread-apart yoke arms respectively terminating at the said centrally-disposed, pivot points on each side of a somewhat reduced diameter and flat rear surface portion of said second earphone/earcup member and thus providing a sufficient clearance space to enable the complete reverse rotation of said second earphone/earcup member in a counterclockwise direction approximately 180° with the said first, main, relatively enlarged cushioned element being thereby removed from the appropriate ear and disposed both for an extended and relatively unrestrained rotation from said normally inwardly-facing and first, headset-communicating position with said first, main, relatively enlarged cushioned element sealed against the corresponding ear of the wearer to a second, outwardly-facing and non-headset-communicating position with the said first, relatively enlarged cushioned element facing away from, and the reduced size and flat rear surface-portion of said second earphone/earcup member now disposed against the head of the wearer to one side of and thereby completely exposing the said corresponding ear of the wearer to direct verbal communication with nearby personnel, while, simultaneously, insuring and thereby allowing the other earcup to remain against its corresponding ear for the monitoring of incoming messages over the headset through the appropriate end of the communications cord; a second communications cord-end portion integrally formed with said first communications cord-end portion and elongated for interconnection with said second earphone/earcup member through the circumference thereof specifically adjacent to a selected one of its pivot points to the corresponding yoke arm to thereby expressly provide clearance with, and thus ensure the said relatively unrestrained rotation of the second earphone/earcup member between its first, normally-inwardly facing position and its second outwardly-facing position away from the wearer's ear; and a second, relatively enlarged, separate and flat padding element formed on and completely covering the flat rear surface portion of, and thus enabling the relatively comfortable positioning of and specifically accommodating the said second earphone/earcup member for substantially prolonged periods to the head of the wearer when in its second, non-headset-communicating position.

* * * * *